US010875419B2

(12) United States Patent
Boeswald et al.

(10) Patent No.: US 10,875,419 B2
(45) Date of Patent: Dec. 29, 2020

(54) CHARGING SYSTEM AND METHOD FOR CONTROLLING OPTIMUM CHARGING PROCESSES

(71) Applicant: Bayerische Motoren Werke Aktiengesellschaft, Munich (DE)

(72) Inventors: Sebastian Boeswald, Munich (DE); Cueneyt Tuerel, Munich (DE); Thorsten Wilms, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/296,406

(22) Filed: Mar. 8, 2019

(65) Prior Publication Data
US 2019/0202314 A1 Jul. 4, 2019

Related U.S. Application Data

(63) Continuation of application No. PCT/EP2017/071668, filed on Aug. 29, 2017.

(30) Foreign Application Priority Data

Sep. 9, 2016 (DE) .................. 10 2016 217 162

(51) Int. Cl.
H01M 10/44 (2006.01)
H01M 10/46 (2006.01)
(Continued)

(52) U.S. Cl.
CPC ............ B60L 53/64 (2019.02); B60L 53/18 (2019.02); B60L 53/51 (2019.02); B60L 53/62 (2019.02);
(Continued)

(58) Field of Classification Search
CPC ...................................... B60L 53/64
(Continued)

(56) References Cited

U.S. PATENT DOCUMENTS

2009/0313034 A1* 12/2009 Ferro .................... B60L 8/003
705/1.1
2011/0224852 A1 9/2011 Profitt-Brown et al.
(Continued)

FOREIGN PATENT DOCUMENTS

DE 10 2009 041 409 A1 3/2011
DE 10 2012 200 140 A1 7/2012
(Continued)

OTHER PUBLICATIONS

International Search Report (PCT/ISA/210) issued in PCT Application No. PCT/EP2017/071668 dated Nov. 23, 2017 with English translation (eight (8) pages).
(Continued)

Primary Examiner — Yalkew Fantu
(74) Attorney, Agent, or Firm — Crowell & Moring LLP

(57) ABSTRACT

A charging system controls an optimum charging process of an at least partially electrically operated vehicle. The electrically operated vehicle has an energy accumulator. The charging system has at least one power source with which the energy accumulator is connected and can be charged, and at least one back end server which can automatically determine an optimum charging plan for charging the energy accumulator based at least on technical state data of the vehicle and an electricity rate that is assigned to the energy source. In this way, when the energy accumulator is connected to the power source, the technical state data of the vehicle is automatically transmitted to the back end server. After the back end server receives the technical status data of the vehicle, the back end server determines the optimum
(Continued)

charging plan. The back end server can control the charging process of the energy accumulator according to the optimum charging plan.

9 Claims, 6 Drawing Sheets

(51) Int. Cl.

| | |
|---|---|
| *B60L 53/64* | (2019.01) |
| *H02J 7/35* | (2006.01) |
| *B60L 53/63* | (2019.01) |
| *B60L 53/66* | (2019.01) |
| *H02J 3/32* | (2006.01) |
| *H02J 7/00* | (2006.01) |
| *B60L 53/65* | (2019.01) |
| *B60L 53/18* | (2019.01) |
| *B60L 53/68* | (2019.01) |
| *B60L 53/51* | (2019.01) |
| *B60L 53/62* | (2019.01) |

(52) U.S. Cl.
CPC ............... *B60L 53/63* (2019.02); *B60L 53/65* (2019.02); *B60L 53/665* (2019.02); *B60L 53/68* (2019.02); *H02J 3/32* (2013.01); *H02J 7/0027* (2013.01); *H02J 7/0071* (2020.01); *H02J 7/35* (2013.01); *B60L 2240/62* (2013.01); *B60L 2240/70* (2013.01); *B60L 2250/14* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01)

(58) Field of Classification Search
USPC .......................................................... 320/101
See application file for complete search history.

(56) References Cited

U.S. PATENT DOCUMENTS

| | | | |
|---|---|---|---|
| 2013/0110330 A1 | 5/2013 | Atluri et al. | |
| 2013/0154561 A1* | 6/2013 | Gadh | ................... H02J 7/0027 320/109 |
| 2014/0312839 A1* | 10/2014 | Uyeki | ................. B60L 11/1838 320/109 |
| 2015/0039391 A1* | 2/2015 | Hershkovitz | .......... G06Q 10/04 705/7.31 |
| 2016/0039301 A1 | 2/2016 | Igarashi et al. | |
| 2019/0263271 A1* | 8/2019 | Ashby | ..................... B60L 53/68 |

FOREIGN PATENT DOCUMENTS

| | | |
|---|---|---|
| DE | 10 2012 219 313 A1 | 5/2013 |
| DE | 10 2013 002 078 A1 | 8/2013 |
| DE | 10 2013 211 265 A1 | 12/2014 |
| DE | 11 2014 001 783 T5 | 12/2015 |
| DE | 10 2014 013 682 A1 | 3/2016 |

OTHER PUBLICATIONS

German-language Written Opinion (PCT/ISA/237) issued in PCT Application No. PCT/EP2017/071668 dated Nov. 23, 2017 (seven (7) pages).

German-language Office Action issued in counterpart German Application No. 10 2016 217 162.3 dated Jun. 21, 2017 (six (6) pages).

* cited by examiner

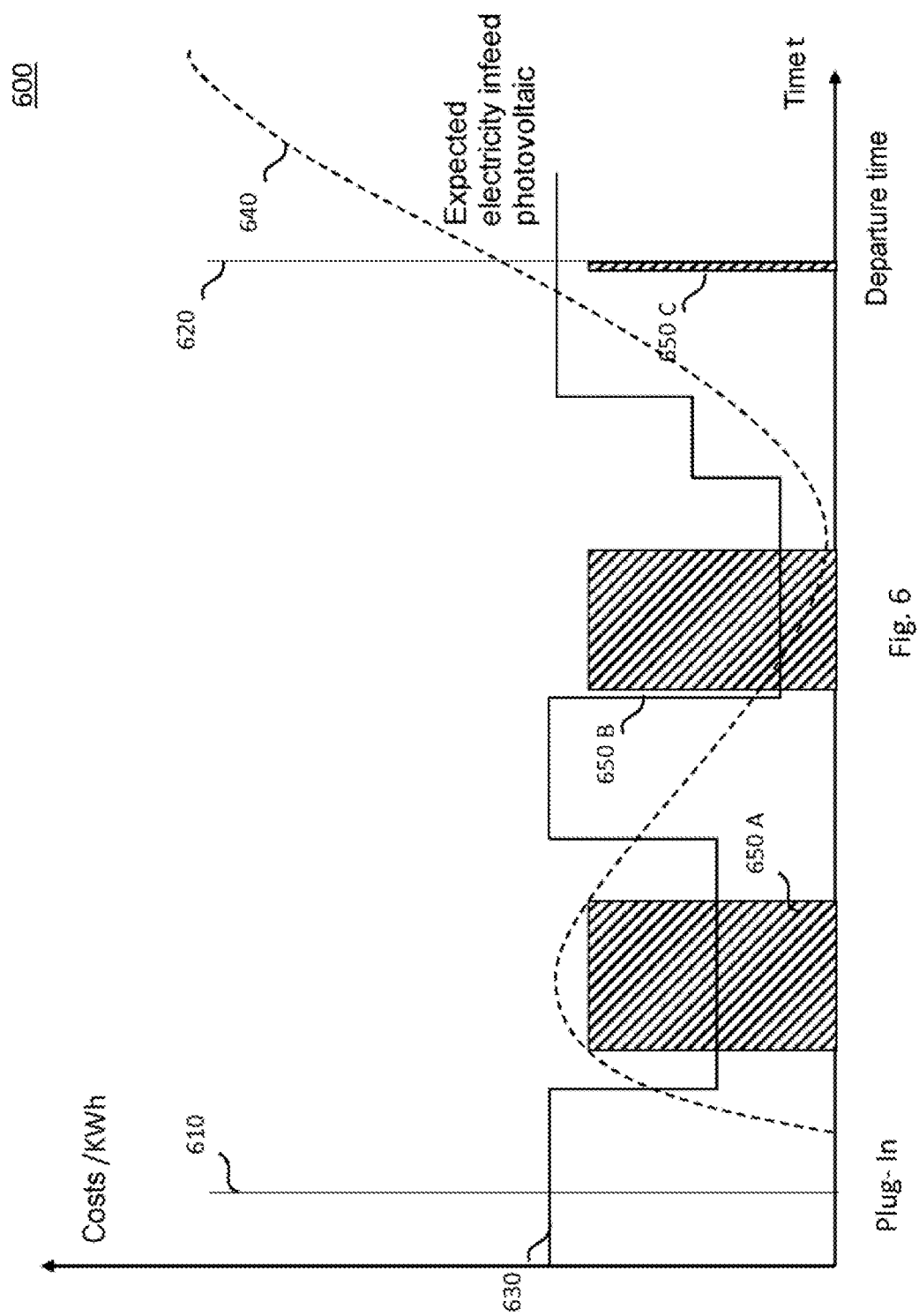

CHARGING SYSTEM AND METHOD FOR CONTROLLING OPTIMUM CHARGING PROCESSES

CROSS REFERENCE TO RELATED APPLICATIONS

This application is a continuation of PCT International Application No. PCT/EP2017/071668, filed Aug. 29, 2017, which claims priority under 35 U.S.C. § 119 from German Patent Application No. 10 2016 217 162.3, filed Sep. 9, 2016, the entire disclosures of which are herein expressly incorporated by reference.

BACKGROUND AND SUMMARY OF THE INVENTION

The present invention relates to a charging system and a method for controlling optimum charging processes of at least partly electrically operated vehicles.

Electric vehicles, for example electrically operated two-wheeled vehicles and scooters, but in particular also electric cars having at least an assistive electric drive, are known. In this respect, micro, mild and fully hybrid vehicles are known that implement parallel, split-power, series hybrid drive concepts. In particular, plug-in hybrids are known, in which the electrical energy stores—as in the case of purely electric drive concepts—are able to be charged via the electricity grid.

The increasing electrification of mobility in relation to electric vehicles, the energy stores of which are able to be charged at least partly via the electricity grid, and the fact that there has not been a satisfactory infrastructure of electricity charging points for a long time, means, for users of electric vehicles, in particular of purely electrically operated electric cars (battery electric vehicle, BEV) and of plug-in hybrids (plug-in hybrid electric vehicle, PHEV), that they have to use their personal, private environment to charge the corresponding energy store. Users are thus confronted with using a private electricity source—for example a household socket or a private wall charging station or wall box—to charge the electric vehicle. However, private electricity sources are subject to a multiplicity of fluctuations. By way of example, a maximum electricity load of the household with respect to a current electricity consumption in the household by other electricity consumers (household load) has to be taken into account in each case for each charging process. It may thus be the case that, due to a household load that is currently very high, a charging process of the energy store has to be postponed for safety reasons. This may lead to a situation whereby the charging process of the energy store is forgotten. Due to the high charging time of electric vehicles at household sockets or private wall charging stations, it may therefore be the case that the user is not able to cover a planned journey. In addition, fluctuations often occur in electricity tariffs, such as for example daytime and nighttime electricity tariffs. However, there are also many more dynamic electricity tariffs or time-variable tariffs that adjust dynamically to fluctuating input powers of wind and solar energy. One example of this is a time-of-use tariff that is adjusted individually to historic or current load curves over the course of the day, week and/or season. Time-of-use tariffs, in some markets, even offer a monetary refund if electricity is purchased at times in which an overcapacity (for example from wind power plants) is present. Manual consideration of fluctuating electricity tariffs by the user of the electric vehicle is cumbersome and inconvenient from an operational point of view.

The object of the invention is that of avoiding the above-mentioned disadvantages and of providing a solution that allows in particular automatic calculation and control of time-optimized and cost-optimized charging processes of at least partly electrically operated vehicles.

According to a first aspect of the invention, a charging system for controlling an optimum charging process of an at least partly electrically operated vehicle is provided. The at least partly electrically operated vehicle in this case has an energy store. The charging system comprises at least one electricity source to which the energy store is able to be connected and by way of which it is able to be charged. The electricity source may be a commercially available household socket or shockproof socket or a wall charging station or wall box.

The charging system furthermore comprises at least one back-end server that is able automatically to identify an optimum charging plan for charging the energy store on the basis at least of technical state data from the vehicle and an electricity tariff that is assigned to the electricity source. By way of example, the user of the vehicle may input an electricity tariff associated with the household of the electricity source, which tariff is stored in a storage unit, for example a database, of the back-end server, using a terminal—for example PC or laptop—, a mobile terminal—for example smartphone, but also other mobile telephones, personal digital assistants (PDAs), tablet PCs, etc. that are equipped with technology for loading and executing apps—or an operating unit installed in the vehicle—for example using a human-machine interface of an on-board computer of the vehicle. The abovementioned devices may communicate with the back-end server via a suitable communication interface, such as for example a mobile network, local area networks (LANs), such as for example Wireless Fidelity (WiFi), or via wide area networks (WANs), such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or World Wide Interoperability for Microwave Access (WIMAX). It is necessary to store the electricity tariff only once or additionally when changing electricity provider and/or electricity tariff.

When the energy store is connected to the electricity source, the technical state data are transmitted automatically from the vehicle to the back-end server. By way of example, one or more controllers, after recognition of the connection of the energy store to the electricity source, may read the correspondingly relevant technical state data of the vehicle from one or more storage units situated in the vehicle and send them to the back-end server via a suitable communication interface (see above). In a further example, the technical state data may be transmitted to the back-end server after each end of a journey. In a further example, the state data may be transmitted from the vehicle to the back-end server cyclically, for example every X minutes. In this case, X is a predefined or predefinable number.

When the back-end server receives the technical state data from the vehicle, said back-end server identifies the optimum charging plan, taking into account the technical state data and the corresponding electricity tariff associated with the household of the electricity source. Furthermore, the back-end server is able to control the charging process of the energy store in accordance with the optimum charging plan. In the case of the cyclic transmission of the state data, it is the plug-in time that triggers the identification of the optimum charging plan, the last received technical state data possibly being decisive in the calculation of the optimum charging plan.

Preferably, a driver of the vehicle is able to define a desired departure time and/or a desired state of charge of the energy store at the end of the charging process. The desired state of charge of the energy store may be a minimum range that the energy store should have at the end of the charging process. The departure time may be input via a human-machine interface of the vehicle or via an operating unit in the vehicle or via the driver's terminal. Advantageously, the driver of the vehicle is thereby able to be sure that the back-end server is calculating an optimum charging plan, and initiates or controls performance thereof such that a state of charge of the energy store that is as high as possible and at the same time optimized in terms of cost is achieved at the desired departure time.

A further advantage of the charging system is that the technical state data are transmitted automatically from the vehicle to the back-end server, and that the back-end server automatically identifies a charging plan for a user of the vehicle in a time-optimized and cost-optimized manner, taking into account the technical state data and an electricity tariff associated with the household of the electricity source, and automatically controls the charging process, associated with the charging plan, of the energy store. The user of the vehicle thus advantageously only has to connect the energy store to the electricity source and is able to be certain that the energy store is being charged in a time-optimized and cost-optimized manner, even if the charging process contains different separate time periods for charging the energy store.

The technical state data preferably comprise a current state of charge of the energy store and position data of the vehicle.

By way of example, global positioning system (GPS) position data of the vehicle and data regarding a current state of charge of the energy store may be read from one or more storage modules situated in the vehicle, via one or more controllers situated in the vehicle, and transmitted to the back-end server via a suitable communication interface. In another example, position data or identification data of a wall box may be transmitted to the vehicle via power line communication (PLC) when the energy store is connected to the electricity source (for example the wall box) using a suitable charging cable. The PLC may also be used to transmit further data, such as for example available charging methods (alternating current (AC), direct current (DC)), current strength and voltage limits (min, max), a maximum connection power over time, etc. These data may also be sent from the vehicle to the back-end server. The back-end server may then calculate the optimum charging plan taking into account these data transmitted via PLC as well. In addition, a controller situated in the vehicle may read the corresponding data regarding a current state of charge of the energy store from a storage module situated in the vehicle and send them to the back-end server via a suitable communication interface. In a further example, the electricity source may be what is called a "smart" wall box that comprises at least a storage unit and a controller and is capable of networking with other distributed devices. When the energy store of the vehicle is connected to the "smart" wall box using a suitable charging cable, the controller therefor may use PLC to read GPS position data and the current state of charge of the energy store from one or more storage units situated in the vehicle and send these to the back-end server via a suitable communication interface. As an alternative thereto, the "smart" wall box may read the current state of charge of the energy store from one or more storage units situated in the vehicle and send specific position data (stored or identified using a specific GPS module) or a specific identification number (the one for example in the back-end server in a storage module, for example database) to the back-end server together with the read data via a suitable communication interface. Furthermore, the "smart" wall box may send specific state data to the back-end server, such as for example personal settings of the household associated with the wall box, as well as specific voltage limits, current strength limits and power limits (min, max).

On the basis of the position data of the vehicle/of the wall box, or on the basis of the identification data of the electricity source that is coupled to a specific position (for example stored with the position in the storage module of the back-end server), the back-end server is able to recognize which household associated with the electricity source is involved in the charging process, and thus identify (for example read from the storage module of the back-end server) an electricity tariff—for example stored beforehand—in order to calculate the optimum charging plan. In addition, the back-end server may identify an electrical charging variable (charging requirement), taking into account the current state of charge of the energy store and a maximum charging capacity of the energy store (may also be transmitted to the back-end server with the technical state data or already be stored for each vehicle in a storage unit of the back-end server), which charging variable constitutes a basis for the calculation of the optimum charging plan.

The charging system preferably additionally comprises a digital electricity meter that is able to detect a current electricity consumption of a household associated with the electricity source, wherein the back-end server is additionally able to calculate the optimum charging plan on the basis of the current electricity consumption and of a maximum electricity capacity of the associated household.

A digital electricity meter or smart meter is a digital energy meter that is incorporated into a communication network and is capable of identifying data regarding an actual energy consumption of the household associated with the electricity source and an actual usage time and of automatically transmitting the identified data to a third unit, in this case to the back-end server. As an alternative thereto, the back-end server may also obtain the collected data from the smart meter by polling or a sending request. In a further example, the back-end server may create an electricity consumption profile of the household on the basis of previous data from the household associated with the electricity source that it has received from the smart meter and use the electricity consumption profile to calculate the optimum charging plan. The maximum electricity capacity of the associated household may be stored for example in the storage unit of the back-end server for each household.

One advantage of incorporating the current electricity consumption of the household associated with the electricity source and the maximum electricity capacity of the household into the calculation of the optimum charging plan is that overload situations in the household are avoided in that the charging power for the charging process of the energy store is able to be adjusted accordingly by the back-end server when there is high electricity consumption in the household, wherein the time-optimized and cost-optimized charging plan is able to be created at the same time taking into account the adjusted charging power.

The back-end server is preferably able to detect changes in the electricity consumption relevant to the calculation of the optimum charging plan and perform a new calculation of the optimum charging plan taking into account these changes in the electricity consumption.

By way of example, the back-end server may request data in relation to the current electricity consumption (polling) from the smart meter at regular intervals during the charging time interval or charging time intervals of the calculated optimum charging plan. If the current electricity consumption changes beyond a predetermined or predeterminable threshold value, the back-end server may perform a new calculation of the optimum charging plan. The back-end server is able to control the charging process of the energy store in accordance with the new calculation of the optimum charging plan.

One advantage of the detection of changes in the electricity consumption is that the optimum charging plan is able to be adjusted dynamically with regard to the maximum electricity capacity of the household upon changes in the current high electricity consumption, as a result of which an overload situation of the household is avoided when the current electricity consumption increases and the charging plan is able to be further dynamically optimized in terms of time and costs for the charging process when the current electricity consumption decreases.

Preferably, the back-end server is additionally able to control smart household devices associated with the electricity source when creating the optimum charging plan, such that an optimum electricity consumption is present in the household associated with the electricity source during charging times calculated for the charging process.

By way of example, the smart meter may be networked with smart household devices—for example correspondingly equipped washing machines and dishwashers. The back-end server may use the smart meter to control the networked smart household devices such that they are switched off or not initially switched on for the charging times calculated for the charging process and are switched on (again) following the charging times calculated for the charging process.

This has the advantage that the charging plan is able to be created in an even more time-optimized and cost-optimized manner for the charging process of the energy store, wherein overload situations in the household associated with the electricity source are avoided at the same time. Furthermore, data in relation to the previous electricity consumption with regard to the household associated with the electricity source may be stored in a storage unit (for example database) accessible to the back-end server (electricity consumption profile). The electricity consumption profile may be taken into account in the calculation of the optimum charging plan. This has the advantage that regulations that have to be performed during the performance of the optimum charging plan on account of deviations from the optimum charging plan are minimized. As a result, the optimum charging plan is also able to be optimally implemented, such that the vehicle has the desired state of charge at the time desired by the driver.

The charging system preferably additionally comprises a photovoltaic installation that is able to feed electricity to a household associated with the electricity source, wherein the back-end server is additionally able to calculate the optimum charging plan taking into account a current electricity infeed.

The term "current electricity infeed" should be understood to mean a time interval, relevant to the charging process, of the electricity infeed through the photovoltaic installation. By way of example, the user of the vehicle may initially store power data and state data of the photovoltaic installation once at the back-end server via a suitable interface (for example human-machine interface, HMI). The state data comprise the alignment, incline, etc. of the photovoltaic installation. Before each calculation of the optimum charging plan, the back-end server may request current weather data and a weather forecast from a corresponding service provider (request-response). In this case, the service provider may be the back-end server itself. As an alternative thereto, the service provider may be any desired server able to be retrieved via the Internet.

Taking into account the power data and the state data of the photovoltaic installation, an electricity infeed requested at the plug-in time, the requested weather data and the current weather forecast, the back-end server is able to calculate the expected electricity infeed through the photovoltaic installation during the time interval relevant to the charging process (current electricity infeed). The back-end server may then take this current electricity infeed into account in the calculation of the optimum charging plan.

The back-end server is preferably able to detect changes in the electricity infeed through the photovoltaic installation and perform a new calculation of the optimum charging plan taking into account these changes in the electricity infeed. The back-end server is able to control the charging process of the energy store in accordance with the new calculation of the optimum charging plan.

By way of example, the back-end server is able to detect changes in the weather forecast at regular intervals during the time interval relevant to the charging process or recognize strong deviations between the forecast electricity infeed and an electricity infeed detected by a digital electricity meter and thus perform a new calculation of the current electricity infeed. If the newly calculated current electricity infeed differs from the previously calculated current electricity infeed (which was taken into account in the calculation of the current optimum charging plan) beyond a predefined or predefinable threshold value, the back-end server calculates the optimum charging plan taking into account the newly calculated current electricity infeed through the photovoltaic installation again. The back-end server then controls the charging process of the energy store in accordance with the newly calculated optimum charging plan.

The electricity source is preferably a wall charging station or wall box that is able to receive the calculated optimum charging plan from the back-end server and control the implementation of the optimum charging plan.

By way of example, the wall charging station may be what is called a smart wall charging station that is able to be connected to the Internet via the wireless local area network (W-LAN), for example. The wall charging station is thus able to obtain the optimum charging plan from the back-end server and control the implementation of the optimum charging plan.

This has the advantage that a multiplicity of smart wall charging stations are able to be connected to the back-end server. After the back-end server has calculated the corresponding optimum charging plans, it is able to send these to the corresponding wall charging stations, which then control the implementation. Central management by the back-end server is thus possible.

According to a second aspect, the object is achieved by a method for controlling an optimum charging process of an at least partly electrically operated vehicle, wherein the at least partly electrically operated vehicle has an energy store. The method comprises:

providing at least one electricity source to which the energy store is able to be connected and by way of which it is able to be charged; and
   providing at least one back-end server that is able automatically to identify an optimum charging plan for charging the energy store on the basis at least of technical state data from the vehicle and an electricity tariff that is assigned to the electricity source;
   automatically transmitting the technical state data from the vehicle to the back-end server when the energy store is connected to the electricity source;
   automatically identifying the optimum charging plan using the back-end server after it receives the technical state data from the vehicle; and
   controlling the charging process of the energy store in accordance with the optimum charging plan using the back-end server.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows an exemplary charging plan.

DETAILED DESCRIPTION OF THE DRAWINGS

Figure 1:
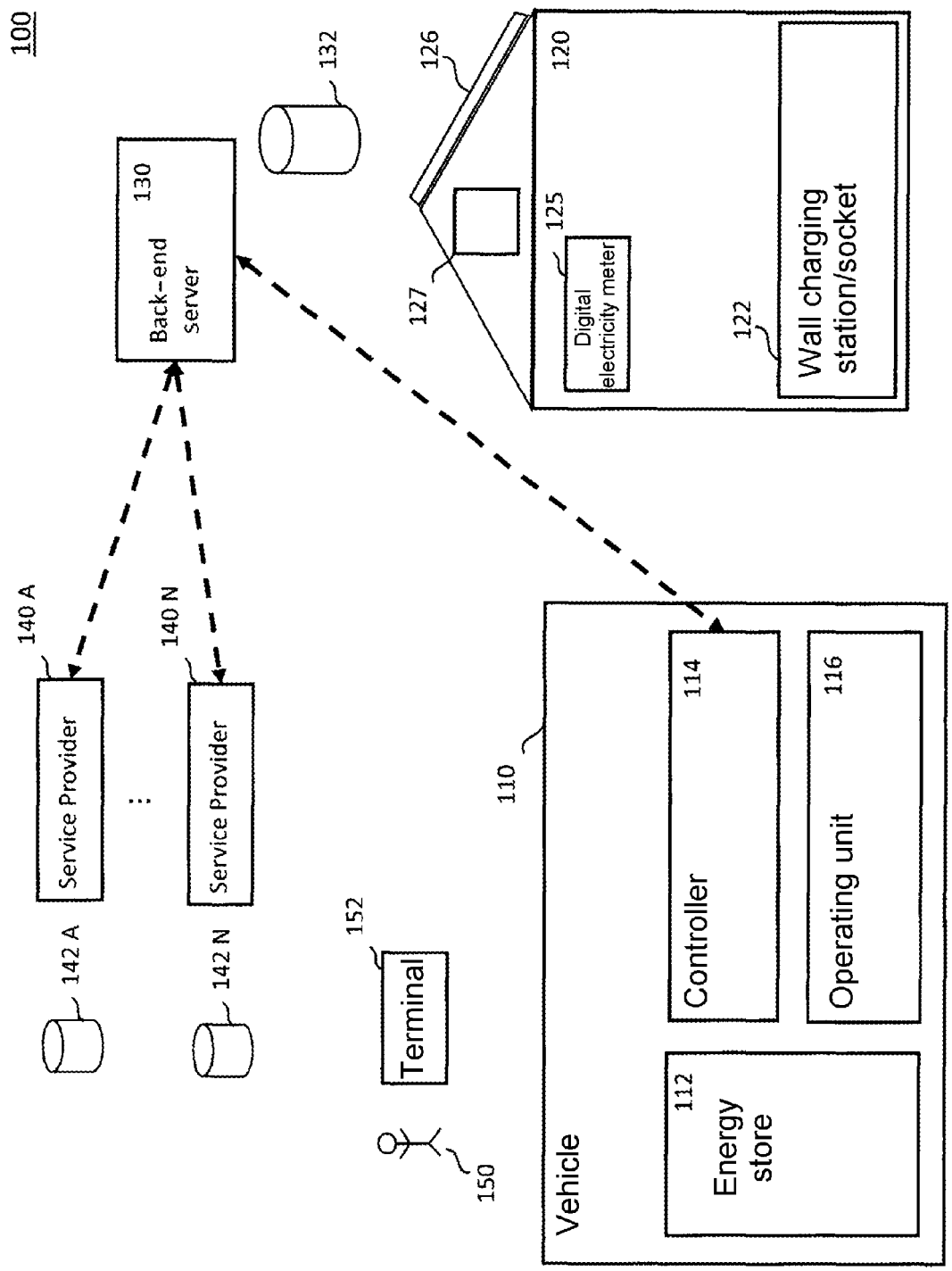
FIG. 1 shows a charging system for controlling an optimum charging process.
Figure 2:
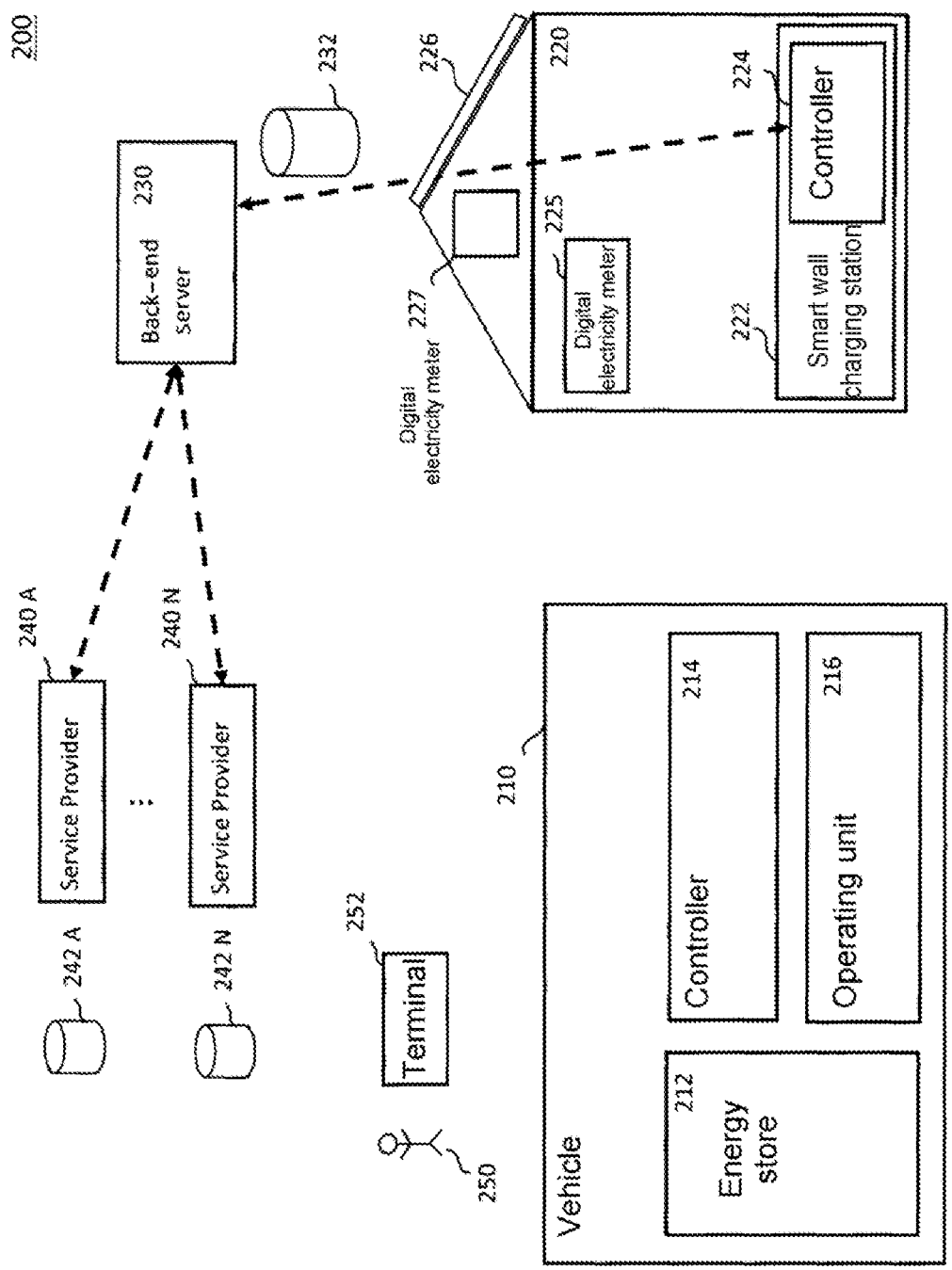
FIG. 2 shows a further charging system for controlling an optimum charging process.

FIGS. 1 and 2 each show exemplary charging systems 100, 200 for controlling an optimum charging process of an at least partly electrically operated vehicle 110, 210. The at least partly electrically operated vehicle 110, 210 in this case has an energy store 112, 212. The charging system 100, 200 comprises at least one electricity source 122, 222 to which the energy store 112, 212 is able to be connected and by way of which it is able to be charged. The electricity source 122 (FIG. 1) may be a commercially available household socket or shockproof socket or a wall charging station or wall box, and the electricity source 222 (FIG. 2) is a "smart" or "networked" wall box that is able to be connected for example via W-LAN to the back-end server 130, 230 and further networked devices, communicate with them and is in particular capable of receiving the optimum charging plan from the back-end server 130, 230 and of controlling the implementation 470 of the optimum charging plan, for example using a controller 224.

The charging system 100, 200 furthermore comprises at least one back-end server 130, 230 that is able automatically to identify an optimum charging plan for charging the energy store 112, 212 on the basis at least of technical state data of the vehicle 110, 210 and an electricity tariff that is assigned to the electricity source 122, 222. By way of example, the user 150, 250 of the vehicle 110, 210 may input an electricity provider and/or electricity tariff associated with the household 120, 220 of the electricity source 122, 222 or relevant to the electricity billing thereof using a terminal 152, 252 or an operating unit 116, 216 installed in the vehicle 110, 210, as explained in more detail further below with reference to FIG. 3. The electricity provider and/or electricity tariff that is input may be stored in a storage unit 132, 232, for example a database, of the back-end server 130, 230. The terminal 152, 252 or the operating unit 116, 216 may communicate with the back-end server 130, 230 via a suitable communication interface, such as for example a mobile network, local area networks (LANs), such as for example Wireless Fidelity (WiFi), or via wide area networks (WANs), such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or World Wide Interoperability for Microwave Access (WIMAX). It is necessary to input the electricity tariff only once or additionally when changing electricity provider/electricity tariff.

When the energy store 112, 212 of the vehicle 110, 210 is connected to the electricity source 122, 222, technical state data are automatically transmitted from the vehicle 110, 210 to the back-end server 130, 230. The technical state data comprise at least a current state of charge of the energy store 112, 212 and position data of the vehicle 110, 210. By way of example, one or more controllers 114, 214 may read the correspondingly relevant technical state data of the vehicle 110, 210 from one or more storage units (not shown) situated in the vehicle 110, 210 and send them to the back-end server 130, 230 via a suitable communication interface (see above).

When the back-end server 130, 230 receives the technical state data from the vehicle 110, 210, said back-end server identifies the optimum charging plan, taking into account the technical state data and the corresponding electricity tariff associated with the household 120, 220 of the electricity source 122, 222 (which electricity tariff, as mentioned above, may be stored in the storage unit 132, 232). Furthermore, the back-end server 130, 230 is able to control the charging process of the energy store 112, 212 in accordance with the optimum charging plan.

One advantage of the charging system 100, 200 is that the technical state data are transmitted automatically from the vehicle 110, 210 to the back-end server 130, 230. The back-end server 130, 230 automatically identifies a time-optimized and cost-optimized charging plan for the charging process of the energy store 112, 212, taking into account the technical state data and an electricity tariff corresponding to the household 120, 220 of the electricity source 122, 222. The back-end server 130, 230 additionally advantageously automatically controls the charging process of the energy store 112, 212. A user 150, 250 of the vehicle 110, 210 thus only has to connect the energy store 112, 212 to the electricity source 122, 222 and is able to be certain that the energy store 112, 212 is being charged in a time-optimized and cost-optimized manner. In this case, the charging process may contain different separate time periods for charging the energy store 112, 212 (as explained in more detail further below with reference to FIG. 6).

Furthermore, the driver 150, 250 of the vehicle 110, 210 may specify a desired departure time. The driver 150, 250 may for instance input, using the operating unit 116, 216 of the vehicle 110, 210 or using the terminal 152, 252, a desired regular departure time, such as for example in the morning, always at the same time of day. Furthermore, or as an alternative thereto, the driver may input a one-off desired departure time, for example the next morning at 5 o'clock. This input may be provided via a corresponding GUI, which provides a date and time field, for example. The driver 150, 250 may then use a calendar and time function to input the desired departure time, which may comprise a desired departure date and a desired departure time of day. As an alternative thereto, any other input method for inputting the desired departure time at the desired departure date and at the desired departure time of day is possible by way of a corresponding GUI that provides the required functionality, via the operating unit 116, 216 or the terminal 152, 252. The desired departure time is then taken into account in the calculation of the optimum charging plan by the back-end server 130, 230.

In addition or as an alternative thereto, the driver 150, 250 may define a desired state of charge or minimum state of charge of the energy store 112, 212 at the end of the charging process. By way of example, the driver 150, 250 may use a corresponding GUI, the operating unit 116, 216 of the vehicle 110, 210 or the terminal 152, 252 to define that, after the charging process, a minimum range in kilometers is ensured. If the user or driver 150, 250 does not input a desired state of charge or minimum state of charge of the energy store 112, 212, the back-end server 130, 230 may set as standard that a fully charged energy store 112, 212 or one that is charged as much as possible is desired.

Furthermore, the user 150, 250 may use the operating unit 116, 216, the terminal 152, 252 or the smart wall box 222 to input whether he wants the vehicle 110, 210 to be air conditioned before the departure time. The preliminary air conditioning may in this case comprise heating or cooling of the vehicle interior to a desired vehicle interior temperature input by the user. As accurate vehicle air conditioning is possible only at the departure time if it is present immediately before the desired departure time, the back-end server 130, 230 may perform the preliminary air conditioning immediately before the desired departure time independently of electricity costs of the electricity tariff that are in force at this time or of an electricity infeed of a photovoltaic installation 126, 226 (see below) (as explained further below with reference to FIG. 6).

The optimum charging plan is then calculated by the back-end server 130, 230 in a time-optimized manner taking into account the desired departure time and/or the desired state of charge, and in a cost-optimized manner taking into account the electricity tariff corresponding to the household 120, 220 of the electricity source, and the implementation of the charging plan is controlled.

One advantage of the charging system 100, 200 is that the technical state data are transmitted automatically from the vehicle 110, 210 to the back-end server 130, 230, and that the back-end server 130, 230 automatically identifies a charging plan for a user 150, 250 of the vehicle 110, 210 in a time-optimized and cost-optimized manner, taking into account the technical state data and an electricity tariff associated with the household 120, 220 of the electricity source 122, 222, and automatically controls the charging process of the energy store 112, 212. The user 150, 250 of the vehicle 110, 210 thus only has to connect the energy store 112, 212 to the electricity source 122, 222 and is able to be certain that the energy store 112, 212 is being charged in a time-optimized and cost-optimized manner, even if the charging process contains different separate time periods for charging the energy store 112, 212 (see FIG. 6).

By way of example, in the exemplary charging system 100 as described in FIG. 1, the back-end server 130 may cause a networked controller 114 situated in the vehicle 110 to perform the charging process of the energy store 112 at the time(s) defined in the optimum charging plan (as described further below with reference to FIG. 6). As an alternative thereto, the back-end server 130 may send the optimum charging plan to the networked controller 114, such that the optimum charging plan is controlled by the controller 114. The networked controller 114 may be a specific controller 114 that provides the corresponding functionality. As an alternative thereto, the controller 114 may additionally contain even more functionalities (such as for example described further below).

The technical state data may comprise a current state of charge of the energy store 112, 212 and position data of the vehicle 110, 210, but also further technical data of the vehicle 110, 210 that are suitable for optimizing a charging time interval for the energy store 112, 212. By way of example, global positioning system (GPS) position data of the vehicle 110, 210 and data regarding a current state of charge of the energy store 112, 212 may be read from one or more storage modules (not shown) situated in the vehicle 110, 210, via one or more controllers situated in the vehicle 110, 210, and transmitted to the back-end server 130, 230 via a suitable communication interface.

In another example of a charging system 200 as described with reference to FIG. 2, position data of the vehicle 210 may be transmitted to a smart wall box 222 or the back-end server 230 or identification data of the smart wall box 222 may be transmitted to the vehicle 210 via power line communication (PLC) when the energy store 212 is connected to the electricity source 222 (for example the smart wall box) using a suitable charging cable. In addition, a controller 214 situated in the vehicle 210 may read the corresponding data regarding a current state of charge of the energy store 212 from a storage module (not shown) situated in the vehicle 210 and send them to the back-end server 230 via a suitable communication interface. The electricity source may be what is called a "smart" wall box 222 that comprises at least a storage unit (not shown) and a controller 224 and is capable of networking with other distributed devices. When the energy store 212 of the vehicle 210 is connected to the "smart" wall box 222 via a suitable charging cable, the controller 224 of the wall box 222 may receive or detect GPS position data and the current state of charge of the energy store 212 and send these to the back-end server 230 via a suitable communication interface. As an alternative thereto, the "smart" wall box 222 may read the current state of charge of the energy store 212 from one or more storage units situated in the vehicle 210 and send specific position data (stored or identified using a specific GPS module) or a specific identification number (which is stored for example in the back-end server 230 together with a particular position in a storage module 232) to the back-end server 230 together with the read data via a suitable communication interface. In the case of the smart wall box 222, all of the settings described herein may also be performed, instead of using the operating unit 116, 216 or using the terminal 152, 252, using a corresponding input device at the wall box 222.

On the basis of the position data of the vehicle 210/of the wall box 222, or on the basis of the identification data of the electricity source 222 that is coupled to a specific position, the back-end server 230 is able to recognize which household 220 associated with the electricity source 222 is involved in the charging process, and thus identify an electricity tariff—for example stored beforehand (cf. FIG. 3)—in order to calculate the optimum charging plan. In addition, the back-end server 230 may identify an electrical charging variable (charging requirement), taking into account the current state of charge of the energy store 212 and a maximum charging capacity of the energy store 212 (may also be transmitted to the back-end server 230 with the technical state data or already be stored for each vehicle 210 in a storage unit 232 of the back-end server 230), which charging variable constitutes the basis for the calculation of the optimum charging plan.

The charging system 100, 200 may additionally comprise a digital electricity meter 125, 225 that is able to detect a current electricity consumption of a household 120, 220 associated with the electricity source 122, 222. In this case, the back-end server 130, 230 is additionally able to calculate the optimum charging plan, taking into account the current electricity consumption and a maximum electricity capacity of the associated household 120, 220.

A digital electricity meter or smart meter 125, 225 is a digital energy meter that is incorporated into a communication network and is capable of identifying data regarding an actual energy consumption of the household 120, 220 associated with the electricity source 122, 222 and an actual usage time and of automatically transmitting the identified data to a third distributed and networked unit, in this case to the back-end server 130, 230. As an alternative thereto, the back-end server 130, 230 may also obtain the collected data from the smart meter 125, 225 by polling or a sending request. In a further example, the back-end server 130, 230 may create an electricity consumption profile of the household 120, 220 on the basis of previous data from the household 120, 220 associated with the electricity source 122, 222 that it has received from the smart meter 125, 225 and use the electricity consumption profile to calculate the optimum charging plan.

One advantage of incorporating the current electricity consumption of the household 120, 220 associated with the electricity source 122, 222 and the maximum electricity capacity of the household 120, 220 into the calculation of the optimum charging plan is that overload situations are avoided in that the charging power of the electricity source 122, 222 for the charging process of the energy store 112, 212 is adjusted accordingly by the back-end server 130, 230 when there is high current electricity consumption in the household 120, 220, wherein the time-optimized and cost-optimized charging plan is able to be created at the same time in accordance with the adjusted charging power of the electricity source 122, 222. Furthermore, a number of required regulations that have to be performed during the performance of the optimum charging plan on account of deviations from the optimum charging plan are minimized. As a result, the optimum charging plan is also able to be optimally performed, such that the vehicle 110, 210 (optionally) has the desired state of charge at the time desired by the driver 150, 250.

The back-end server 130, 230 is preferably able to detect changes in the electricity consumption relevant to the calculation of the optimum charging plan, and perform a new calculation of the optimum charging plan taking into account these changes in the electricity consumption.

By way of example, the back-end server 130, 230 may request data in relation to the current electricity consumption (polling) from the smart meter 125, 225 at regular intervals during the charging time interval or charging time intervals of the calculated optimum charging plan. If the current electricity consumption changes beyond a predetermined or predeterminable threshold value, the back-end server 130, 230 may perform a new calculation of the optimum charging plan. The back-end server 130, 230 may control the charging process of the energy store 112, 212 in accordance with the new calculation of the optimum charging plan (either actively, or by sending the charging plan to the controller 114 of the vehicle 210 or to the controller 224 of the wall box 222 and the implementation is controlled from there).

One advantage of detecting and taking into account changes in the electricity consumption of the household 120, 220 associated with the electricity source 122, 222 is that the optimum charging plan is able to be adjusted dynamically to relevant changes in the electricity consumption with regard to the maximum electricity capacity of the household 120, 220. Thus, overload situations are able to be avoided when the current electricity consumption increases, and the charging plan is able to be dynamically optimized in terms of time and costs for the charging process of the energy store 112, 212 when the current electricity consumption decreases.

The back-end server 130, 230 is additionally able to control smart household devices (not shown) associated with the household 120, 220 of the electricity source 122, 222 when creating the optimum charging plan, such that an optimum electricity consumption is present in the household 120, 220 associated with the electricity source 122, 222 during charging times calculated for the charging process of the energy store 112, 212.

By way of example, the smart meter 125, 225 may be networked with smart household devices—such as for example correspondingly equipped washing machines and dishwashers. The back-end server 130, 230 may use the smart meter 125, 225 to control the networked household devices such that they are switched off or not initially switched on for the charging times calculated for the charging process of the energy store 112, 212 (cf. FIG. 6) and are switched on (again) following the charging times calculated for the charging process of the energy store 112, 212.

This has the advantage that the charging plan is able to be created in an even more time-optimized and cost-optimized manner, wherein overload situations in the household 120, 220 associated with the electricity source 122, 222 are avoided at the same time.

The charging system 100, 200 may additionally comprise a photovoltaic installation 126, 226 that is able to feed electricity to a household 120, 220 associated with the electricity source 122, 222. The back-end server 130, 230 is additionally able to calculate the optimum charging plan taking into account a current electricity infeed through the photovoltaic installation 126, 226.

The term "current electricity infeed" should be understood to mean a time interval, relevant to the charging process of the energy store 112, 212, of the electricity infeed (cf. FIG. 6) through the photovoltaic installation 126, 226. By way of example, the user 150, 250 of the vehicle 110, 210 may send power data and/or state data of the photovoltaic installation 126, 226 once to the back-end server 130, 230 via a suitable operating unit 116, 216 or a terminal 152, 252. The back-end server 130, 230 may store the received power data and/or state data in a storage unit 132, 232, for example. Before each calculation of the optimum charging plan, the back-end server 130, 230 may initially retrieve an electricity infeed through the photovoltaic installation 126, 226 to the household 120, 220 present at the plug-in time from a digital electricity meter 127, 227. In addition, the back-end server 130, 230 may request current weather data and a weather forecast from a corresponding service provider 140, 240 (request-response). In this case, the service provider 140, 240 may be the back-end server 130, 230 itself. As an alternative thereto, the service provider 140, 240 may be any desired server able to be retrieved via the Internet. Taking into account the stored power data and/or state data of the photovoltaic installation 126, 226, the electricity infeed present at the plug-in time (requested from the digital electricity meter 127, 227), the requested weather data and the current weather forecast, calculate the expected electricity infeed through the photovoltaic installation 126, 226 during the time interval relevant to the charging process (current electricity infeed). The back-end server 130, 230 is then able to take the current electricity infeed into account in the calculation of the optimum charging plan. A complex charging plan is thus able to be implemented by way of the back-end server 130, 230, which charging plan contains the fact that a charging process is able to be interrupted and continued later.

To this end, the user 150, 250 is able to input, via the operating unit 116, 216 or the terminal 152, 252, whether he prefers a particularly high proportion of solar electricity fed in through the photovoltaic installation 126, 226 for charging processes of the energy store 112, 212. This preference may be stored in the storage unit 132, 232 of the back-end server 130, 230. The optimum charging plan may advantageously be created taking into account this preference for the charging process in a particularly environmentally friendly manner.

The back-end server 130, 230 is furthermore able to detect changes in the electricity infeed through the photovoltaic installation 126, 226 and, taking into account these changes in the electricity infeed, perform a new calculation of the optimum charging plan. The back-end server 130, 230 is able to control the charging process of the energy store 112, 212 in accordance with the new calculation of the optimum charging plan.

By way of example, the back-end server 130, 230 is able to detect changes in the weather forecast at regular intervals during the time interval relevant to the charging process (cf. FIG. 6) (retrieved or received from the one or more service providers 140, 240) and thus perform a new calculation of the current electricity infeed. In addition or as an alternative thereto, the back-end server 130, 230 may use actual electricity infeed data identified by the digital electricity meter 127, 227 to recognize whether these deviate from the "current electricity infeed".

If the newly calculated or measured current electricity infeed differs from the previously calculated current electricity infeed (which was taken into account in the calculation of the current optimum charging plan) beyond a predefined or predefinable threshold value, the back-end server 130, 230 calculates the optimum charging plan taking into account the newly calculated current electricity infeed through the photovoltaic installation 126, 226 again. The back-end server 130, 230 then controls the charging process of the energy store 112, 212 in accordance with the newly calculated optimum charging plan. The optimum charging plan is thereby advantageously able to be adjusted dynamically to an actual electricity infeed through the photovoltaic installation 126, 226.

The electricity source 122, 222 is preferably a wall charging station or wall box that is able to receive the calculated optimum charging plan from the back-end server 130, 230 and control the implementation of the optimum charging plan.

By way of example, the wall charging station 122, 222 may be what is called a smart wall charging station 222 that is able to network with other distributed and networked devices via the wireless local area network (W-LAN), for example. The smart wall charging station 222 may thus receive the optimum charging plan from the back-end server 230 and control the implementation of the optimum charging plan using a corresponding controller 224.

A multiplicity of smart wall charging stations 222 are thus able to be connected to the back-end server 230. After the back-end server 230 has calculated the corresponding optimum charging plans, it is able to send these to the corresponding smart wall charging stations 222, which then control the implementation locally. Central creation and management of optimum charging processes by the back-end server 230 is thus made possible.

The user 150, 250 may retrieve a log of all of the charging processes and costs saved by the automatic, time-optimized and cost-optimized charging processes via the energy source 122, 222 in comparison with conventional charging processes from the back-end server 130, 230 using the operating unit 116, 216 or using the terminal 152, 252.

The user 150, 250 has the possibility of overwriting the time-optimized and cost-optimized charging process with a "charge now" charging process of the energy store 112, 212, which may optionally be selected using the operating unit 116, 216, using the terminal 152, 252 or using the smart wall box 222, for example. The calculation and control of the optimum charging plan is then performed by the back-end server 130, 230 again automatically in the next charging process.

The charging system 100, 200 is thus advantageously able to take into account short-term electricity tariff fluctuations as well as the electricity from a photovoltaic installation 126, 226 fed to the household 120, 220 and dynamically create time-optimized, cost-optimized and environmentally optimized charging plans for charging energy stores 112, 212, depending on the setting of the user.

Figure 3:
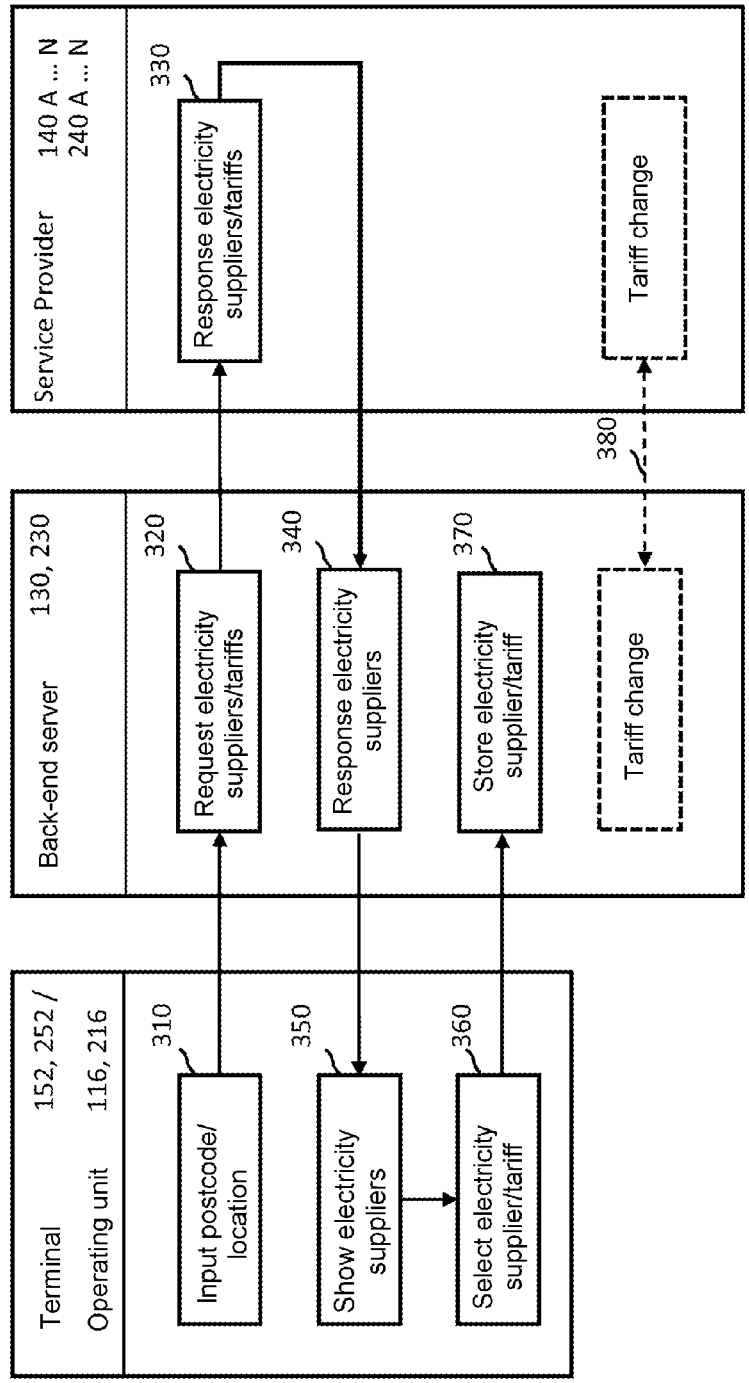
FIG. 3 shows exemplary steps for the storage of electricity tariffs by a user.

FIG. 3 shows exemplary steps that may be performed by a user 150, 250 when storing an electricity tariff for a household 120, 220 associated with the electricity source 122, 222. The user 150, 250 may input for example a postcode or a location using a corresponding terminal 152, 252 or an operating unit 116, 216 present in the vehicle 110, 210 (step 310) via a corresponding GUI. The input data are then sent to the back-end server 130, 230. In step 320, the back-end server 130, 230 requests electricity suppliers and/or electricity tariffs available at the input postcode via at least one service provider 140, 240 (request). By way of example, the service provider 140, 240 may be an external server that provides the corresponding functionality via the client-server paradigm. As a response, the service provider 140, 240 prepares a corresponding list of available electricity suppliers and/or tariffs (response, step 330) and sends this to the back-end server 130, 230. The back-end server 130, 230 forwards the obtained response to the terminal 152, 252 or the operating unit 116, 216 (step 340). The electricity suppliers and/or electricity tariffs contained in the response are displayed in the GUI of the terminal 152, 252 or of the operating unit 116, 216 (step 350). Using the GUI, the user 150, 250 of the terminal 152, 252 or of the operating unit 116, 216 is able to select an electricity supplier and a corresponding electricity tariff associated with the household 120, 220 (and which is relevant to the electricity billing of the household 120, 220) (step 360). This selection is sent to the back-end server 130, 230 and stored there in a storage unit 132, 232 as being associated with the household 120, 220 (step 370). These steps only have to be performed once upon registration of a household 120, 220 associated with the electricity source 122, 222 or additionally when changing electricity supplier or tariff.

It is understood that the transmission of the electricity tariff associated with the household 120, 220 by the user 150, 250 to the back-end server 130, 230 may also be carried out in any other suitable manner.

In addition, changes in the electricity tariff associated with the household 120, 220, such as for example cost increases or cost decreases, may be identified (step 380). By way of example, the service provider 140, 240 may send the back-end server 130, 230 a corresponding message upon each change with regard to the stored electricity tariff. In another example, the back-end server 130, 230 may send a request to the service provider 140, 240 with regard to changes at regular intervals and obtain a corresponding response therefrom.

Figure 4:
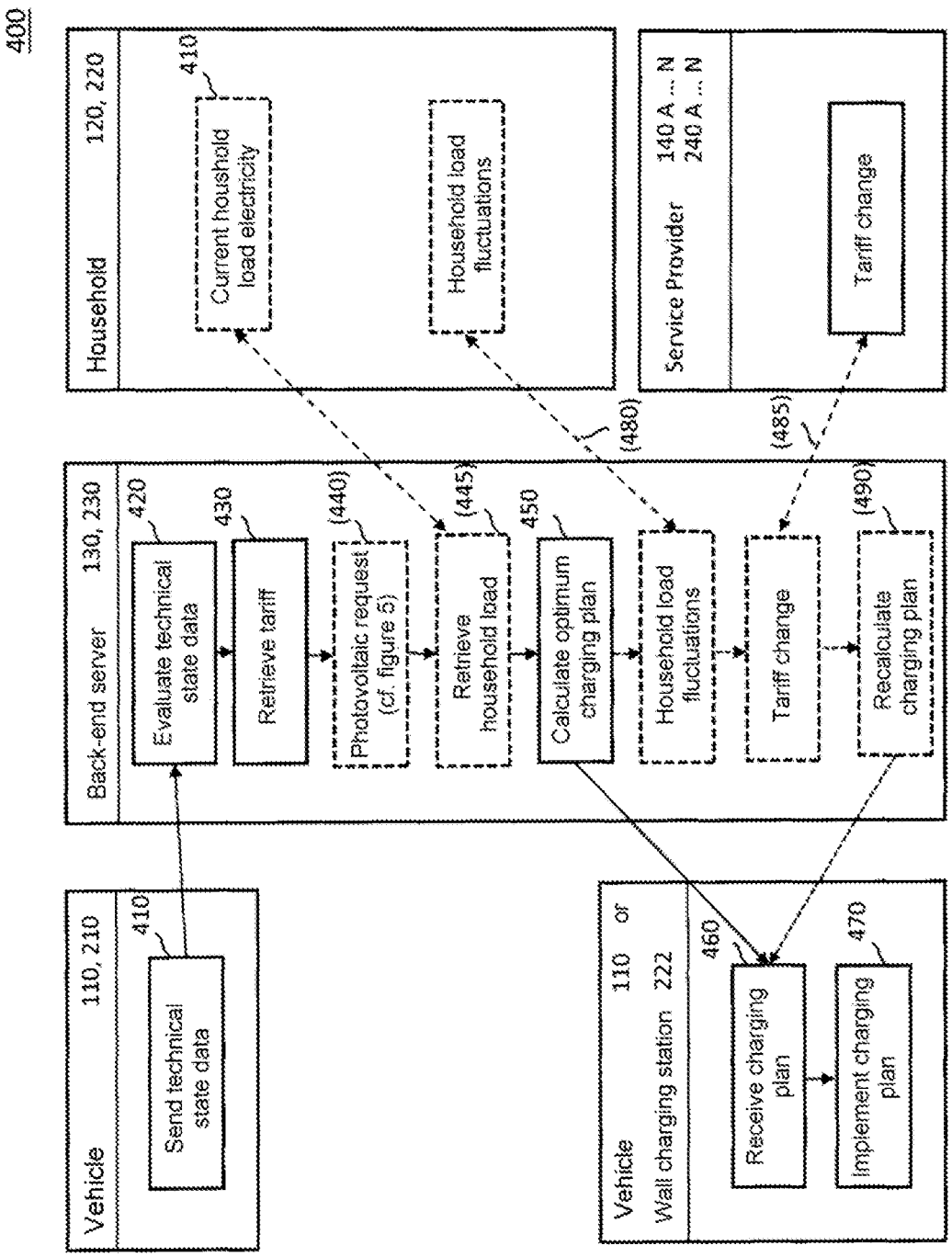
FIG. 4 shows exemplary steps for the calculation and control of the optimum charging plan.

FIG. 4 shows exemplary steps that may be performed in the calculation of the optimum charging plan. It is understood that some steps are performed optionally or that some steps may proceed differently in terms of their order.

As explained with reference to FIGS. 1 and 2, the vehicle 110, 210 sends technical state data of the vehicle 110, 210 to the back-end server 130, 230 (step 410) when the energy store 112, 212 is connected to the electricity source 122, 222. The technical state data may comprise a current state of charge of the energy store 112, 212 of the vehicle 110, 210 and position data of the vehicle 110, 210. The back-end server 130, 230 may then perform an evaluation of the technical state data (step 420). By way of example, the back-end server 130, 230 may identify the charging requirement from the position data of the vehicle 110, 210 and the current state of charge of the energy store 112, 212 (as explained further above with reference to FIGS. 1 and 2). On the basis of the position data of the vehicle 110/of the wall box 222, or on the basis of the identification data of the wall box 222 that is coupled to a specific position, the back-end server 130, 230 is able to recognize which household 120, 220 associated with the electricity source 122, 222 is involved in the charging process, and thus to retrieve or request an electricity tariff—for example stored beforehand—in order to calculate the optimum charging plan from the storage unit 132, 232 (step 420). In the event that a photovoltaic installation 126, 226 is also stored for this household 120, 220, in a next step, the back-end server 130, 230 may retrieve or request stored power data and/or state data of the photovoltaic installation 126, 226 from the storage unit 132, 232 (step 440). In addition, the back-end server 130, 230—if stored by the user 150, 250 for the household 120, 220, for example—may retrieve or request a current household load from the digital electricity meter 115, 225 or—as explained further above with reference to FIGS. 1 and 2, read it from the electricity consumption profile of the household 120, 220 (step 445, this step is explained in more detail with reference to FIG. 5). On the basis of the identified data, the back-end server 130, 230 is able to calculate the optimum charging plan and send it to the networked controller 114 in the vehicle 110 or the controller 224 in the smart wall box 222 (step 450). The corresponding controller 114 or 224 may receive the charging plan (step 460) and control the implementation of the charging process of the energy store 112, 212 in accordance with the optimum charging plan (step 470). As an alternative thereto, the back-end server 130, 230 is able to control the implementation of the charging process of the energy store 112, 212 in accordance with the optimum charging plan (step 470).

As described further above, the back-end server 130, 230 is able to recognize changes or fluctuations in the household load of the household 120, 220 (step 480). By way of example, the back-end server 130, 230 may request data in relation to the current electricity consumption (polling) from the smart meter 125, 225 at regular intervals during the charging time interval or charging time intervals of the calculated optimum charging plan (cf. FIG. 6). If the current electricity consumption changes beyond a predetermined or predeterminable threshold value, the back-end server 130, 230 may perform a new calculation of the optimum charging plan (step 490). The back-end server 130, 230 is able to control the charging process of the energy store 112, 212 in accordance with the new calculation of the optimum charging plan (either actively, or by sending the charging plan to the controller 114 of the vehicle 110 or to the controller 224 of the wall box 222 and the implementation is controlled from there) (step 470).

In addition, the back-end server 130, 230 is able to recognize tariff changes (for example price increases, price decreases or new/additional price fluctuations throughout the course of the day) (step 485). By way of example, the service provider 140, 240 may send the back-end server 130, 230 a corresponding message upon each tariff change. In another example, the back-end server 130, 230 may send a request to the service provider 140, 240 with regard to tariff changes at regular intervals and obtain a corresponding response therefrom. If the electricity tariff changes beyond a predetermined or predeterminable threshold value, the back-end server 130, 230 may perform a new calculation of the optimum charging plan (step 490). The back-end server 130, 230 is able to control the charging process of the energy store 112, 212 in accordance with the new calculation of the optimum charging plan (either actively, or by sending the charging plan to the controller 114 of the vehicle 110 or to the controller 224 of the wall box 222 and the implementation is controlled from there) (step 470).

Figure 5:
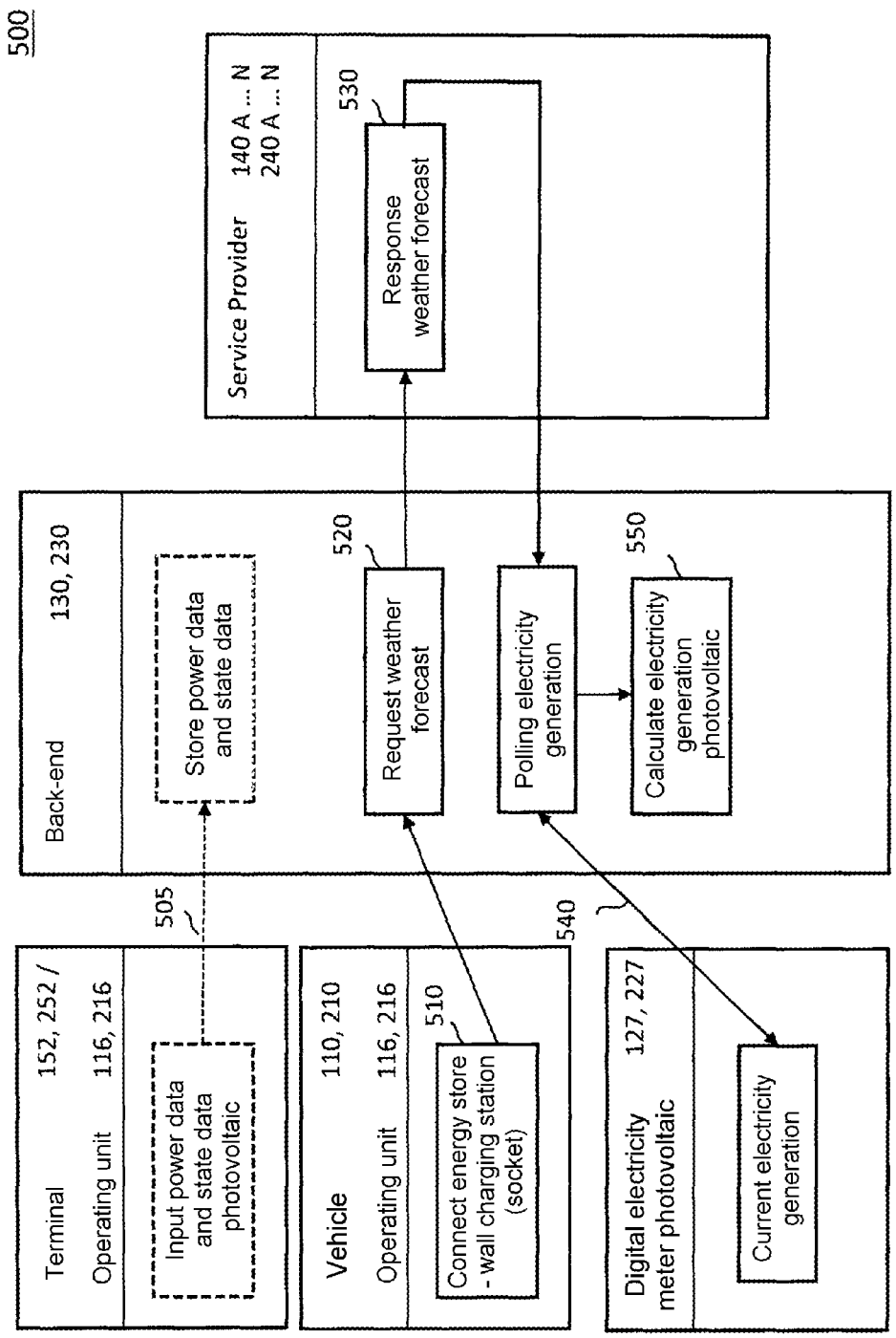
FIG. 5 shows exemplary steps for the calculation of the current electricity infeed of the photovoltaic installation.

FIG. 5 shows exemplary steps that may be performed in the calculation of the current electricity generation through the photovoltaic installation 126, 226.

First of all, the user 150, 250 of the vehicle 110, 210 has to input power data and/or state data of the photovoltaic installation 126, 226 once using the terminal 152, 252 or the operating unit 116, 216. The input power data and/or are then sent to the back-end server 130, 230 and stored there in a storage module 132, 232 in relation to the corresponding household 120, 220 associated with the electricity source 122, 222 (step 505). The reference to the corresponding household 120, 220 associated with the electricity source 122, 222 may for example comprise storing current position data (for example GPS data) of the vehicle 110, 210. At each plug-in time, that is to say upon each connection of the energy store 112, 212 to the electricity source (wall box or socket) 122, 222 (step 510), the back-end server 130, 230 requests, via a request to one or more service providers 140, 240, current weather data and a weather forecast (request, step 520). The service provider(s) 140, 240 generate(s) a response that contains the current weather data and a weather forecast and sends this to the back-end server 130, 230 (response, step 530). In addition, the back-end server 130, 230 retrieves data in relation to an electricity infeed through the photovoltaic installation 126, 226 that took place at the plug-in time from a digital electricity meter 127, 227 that belongs to said photovoltaic installation (step 540). Steps 520 and 540 may also be performed simultaneously or in reverse order. On the basis of the stored power data, the data in relation to the electricity infeed that took place at the plug-in time, the weather data and the weather forecast, the back-end server 130, 230 finally calculates the current electricity infeed through the photovoltaic installation 126, 226 (step 550). The term "current electricity infeed" comprises the electricity infeed calculated during the time interval relevant to the charging process of the energy store 112, 212. The current electricity infeed is taken into account in the calculation of the optimum charging plan (step 450).

In this case, the user 150, 250 is in particular able to input, once or for each charging process of the energy store 112, 212, separately using the terminal 152, 252 or the operating unit 116, 216 of the vehicle 110, 210, whether he prefers a cost-optimized charging process or a proportion of photovoltaic electricity that is as high as possible in the charging process.

FIG. 6 shows an exemplary optimum charging plan that was calculated by the back-end server 130, 230, taking into account relevant parameters. The vertical line 610 shows a time at which the energy store 112, 212 is connected to the electricity source 122, 222 (plug-in). Immediately after this time, the technical state data are sent from the vehicle 110, 210 to the back-end server 130, 230. The vertical line 620 shows a time that corresponds to the input departure time desired by the user 150, 250 of the vehicle 110, 210. In this example, the user 150, 250 has not given any specifications with regard to a desired state of charge of the energy store 112, 212. If there are no specifications with regard to the desired state of charge of the energy store 112, 212, the back-end server 130, 230 may assume as standard that the user 150, 250 wants a fully charged energy store 112, 212 or one that is as charged as much as possible.

The line 630 shows exemplary changes in the costs/KWh over the time interval between the plug-in and the departure time, in accordance with the dynamic electricity tariff associated with the electricity source 122, 222.

Curve 640 shows an expected electricity infeed through the photovoltaic installation 126, 226, for example in KW (current electricity infeed). It is obvious that the expected electricity power through the photovoltaic installation 126, 226 is in no way related to the costs/KWh, but rather serves merely to better visualize the optimum selection of the charging time windows 650A, 650B, 650C. In other words, this curve does not show the costs/KWh (see y-axis notation), but rather an expected electricity infeed through the photovoltaic installation 126, 226, for example in KW.

The curve begins following the plug-in at "0" on the y-axis, for example because sunrise occurs at this time or just before this time (this being requested by the back-end server 130, 230 from one or more service providers 140, 240). In another example, the back-end server 130, 230 may retrieve corresponding data for a predetermined time interval and store them in the storage unit 132, 232. In this case, the retrieval of the electricity infeed that took place at the plug-in time would amount to 0 KW or a request to the digital electricity meter 127, 227 could be dispensed with.

The back-end server 130, 230 may take into account a temporal shift, due to the type and/or power of the photovoltaic installation 126, 226, between the first solar irradiation (due to sunrise) and actual electricity generation through the photovoltaic installation 126, 226.

The time intervals 650 A, 650 B and 650 C show three exemplary charging time intervals that were determined by the back-end server 130, 230 for the full charging of the energy store 112, 212 in the optimum charging plan. It may be seen that the first charging time interval 650 A falls in the time interval in which the highest electricity infeed for the photovoltaic installation 126, 226 falls in the time interval between plug-in 610 and desired departure time 620. The next charging time interval 650 B falls in a time interval in which the costs/KWh in the time interval between plug-in 610 and desired departure time 620 are lowest, and ends before the time interval containing the lowest costs ends, as the energy store 112, 212 of the vehicle 110, 210 is fully charged in this example. The third charging time interval 650 C falls directly before the departure time 620. In this example, the user 150, 250 has input, using the terminal 152, 252 or using the operating unit 116, 216 of the vehicle 110, 210, that he wants to air condition the vehicle 110, 210 before the departure time 620. Since, on account of the lack of specifications with regard to the desired state of charge of the energy store 112, 212, it is assumed as standard that the user 150, 250 would like to have a fully charged energy store 112, 212, the energy for the preliminary air conditioning is drawn from the electricity source 122, 222, without the costs/KWh in force at this time or the electricity infeed through the photovoltaic installation 126, 226 being taken into account. In this example, the energy for the preliminary air conditioning is drawn from the electricity infeed of the photovoltaic installation 126, 226, as the costs/KWh at this time constitute maximum costs in the time interval between plug-in 610 and departure time 620.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging system for controlling an optimum charging process of an at least partly electrically operated vehicle, wherein the at least partly electrically operated vehicle has an energy store, comprising:
   at least one electricity source to which the energy store is able to be connected and by way of which it is able to be charged;
   at least one back-end server that is able automatically to identify an optimal charging plan for charging the energy store on the basis at least of technical state data from the vehicle and an electricity tariff that is assigned to the electricity source; and
   a digital electricity meter that is able to detect a current electricity consumption of a household associated with the electricity source, wherein
   the back-end server is additionally able to calculate the optimum charging plan based on the current electricity consumption and a maximum electricity capacity of the associated household,
   when the energy store is connected to the electricity source, the technical state data are transmitted automatically from the vehicle to the back-end server,
   the back-end server identifies the optimum charging plan after receiving the technical state data from the vehicle, and
   the back-end server is able to control the charging process of the energy store in accordance with the optimum charging plan.

2. The charging system as claimed in claim 1, further comprising:
   an input device configured to receive an input from a user of the vehicle to define a desired departure time or a desired state of charge of the energy store at the end of the charging process.

3. The charging system as claimed in claim 1, wherein the technical state data comprise a current state of charge of the energy store and position data of the vehicle.

4. The charging system as claimed in claim 1, wherein
the back-end server is able to detect changes in the electricity consumption relevant to the calculation of the optimum charging plan and perform a new calculation of the optimum charging plan taking into account these changes in the electricity consumption, and
the back-end server is able to control the charging process of the energy store in accordance with the new calculation of the optimum charging plan.

5. The charging system as claimed in claim 4, wherein
the back-end server is additionally able to control smart household devices associated with the electricity source when creating the optimum charging plan, such that an optimum electricity consumption is present in the household associated with the electricity source during charging times calculated for the charging process.

6. The charging system as claimed in claim 1, further comprising:
a photovoltaic installation that is able to feed electricity to a household associated with the electricity source; wherein
the back-end server is additionally able to calculate the optimum charging plan taking into account a current electricity infeed through the photovoltaic installation.

7. The charging system as claimed in claim 6, wherein
the back-end server is able to detect changes in the electricity infeed through the photovoltaic installation and perform a new calculation of the optimum charging plan taking into account these changes in the current electricity infeed, and
the back-end server is able to control the charging process of the energy store in accordance with the new calculation of the optimum charging plan.

8. The charging system as claimed in claim 1, wherein
the electricity source is a wall charging station, and
the wall charging station is able to receive the optimum charging plan from the back-end server and control implementation of the optimum charging plan.

9. A method for controlling an optimum charging process of an at least partly electrically operated vehicle, wherein the at least partly electrically operated vehicle has an energy store, the method comprising the steps of:
providing at least one electricity source to which the energy store is able to be connected and by way of which it is able to be charged;
providing at least one back-end server that is able automatically to identify an optimum charging plan for charging the energy store on the basis at least of technical state data from the vehicle and an electricity tariff that is assigned to the electricity source;
receiving, by the back-end server, the technical state data automatically transmitted from the vehicle when the energy store is connected to the electricity source;
detecting a current electricity consumption of a household associated with the electricity source;
automatically identifying the optimum charging plan using the back-end server after receiving the technical state data from the vehicle;
calculating the optimum charging plan based on the current electricity consumption and a maximum electricity capacity of the associated household; and
controlling the charging process of the energy store in accordance with the optimum charging plan using the back-end server.

* * * * *